(12) United States Patent
Juels et al.

(10) Patent No.: US 10,846,663 B2
(45) Date of Patent: Nov. 24, 2020

(54) SYSTEMS AND METHODS FOR SECURING CRYPTOCURRENCY PURCHASES

(71) Applicant: Cornell University, Ithaca, NY (US)

(72) Inventors: Ari Juels, New York, NY (US); Faiyam Rahman, Roslyn, NY (US)

(73) Assignee: Cornell University, Ithaca, NY (US)

( * ) Notice: Subject to any disclaimer, the term of this patent is extended or adjusted under 35 U.S.C. 154(b) by 903 days.

(21) Appl. No.: 15/337,481

(22) Filed: Oct. 28, 2016

(65) Prior Publication Data

US 2017/0124535 A1 May 4, 2017

Related U.S. Application Data

(60) Provisional application No. 62/248,011, filed on Oct. 29, 2015.

(51) Int. Cl.
*G06Q 20/06* (2012.01)
*G06Q 20/38* (2012.01)
*G06Q 20/32* (2012.01)

(52) U.S. Cl.
CPC ....... *G06Q 20/065* (2013.01); *G06Q 20/0655* (2013.01); *G06Q 20/3224* (2013.01); *G06Q 20/382* (2013.01); *G06Q 20/389* (2013.01)

(58) Field of Classification Search
None
See application file for complete search history.

(56) References Cited

U.S. PATENT DOCUMENTS 8,239,671 B2 * 8/2012 Oba .................. H04L 63/06 713/155
8,577,805 B1 11/2013 Oakes, III et al.
(Continued)

FOREIGN PATENT DOCUMENTS

AU  2015101403 A4  11/2015
CA  2843034 A1  8/2015
(Continued)

OTHER PUBLICATIONS

G. Wiley et al., "Using DANE to Associate Payment Information with Email Addresses," Network Working Group, Internet Draft, Feb. 27, 2015, 17 pages.
(Continued)

*Primary Examiner* — Neha Patel
*Assistant Examiner* — Clay C Lee
(74) *Attorney, Agent, or Firm* — Ryan, Mason & Lewis, LLP

(57) ABSTRACT

An apparatus in one embodiment comprises a processing platform having at least one processing device. The processing platform implements a database configured to store bindings between user identity information and respective cryptocurrency addresses for users of an address-based cryptocurrency, and an account-identity service system accessible to at least one cryptocurrency vendor. The account-identity service system is configured to utilize the stored bindings to respond to queries from the cryptocurrency vendor. A given one of the queries from the cryptocurrency vendor identifies a particular one of the users and a corresponding cryptocurrency address for which the particular user has requested to purchase an amount of the address-based cryptocurrency. The account-identity service system is configured to generate a response to the given query that indicates whether or not the particular user has its user identity information bound to the corresponding cryptocurrency address for the requested purchase in one of the stored bindings.

20 Claims, 3 Drawing Sheets

(56) References Cited

U.S. PATENT DOCUMENTS

| | | | |
|---|---|---|---|
| 9,049,027 B2* | 6/2015 | Etheridge | H04L 9/3247 |
| 9,135,424 B2* | 9/2015 | Taveau | G06Q 20/02 |
| 2002/0022966 A1 | 2/2002 | Horgan | |
| 2002/0087469 A1* | 7/2002 | Ganesan | G06Q 20/102 |
| | | | 705/40 |
| 2004/0044739 A1* | 3/2004 | Ziegler | G06Q 20/4014 |
| | | | 709/213 |
| 2015/0120536 A1 | 4/2015 | Talker | |
| 2015/0186853 A1* | 7/2015 | Suzukake | G06Q 20/105 |
| | | | 705/41 |
| 2015/0220928 A1* | 8/2015 | Allen | G06Q 20/3829 |
| | | | 705/67 |
| 2015/0287026 A1 | 10/2015 | Yang et al. | |
| 2015/0302401 A1* | 10/2015 | Metral | G06Q 20/06 |
| | | | 705/71 |
| 2015/0356523 A1 | 12/2015 | Madden | |
| 2015/0363770 A1 | 12/2015 | Ronca et al. | |
| 2015/0363778 A1 | 12/2015 | Ronca et al. | |
| 2015/0365283 A1 | 12/2015 | Ronca et al. | |
| 2016/0071096 A1 | 3/2016 | Rosca | |
| 2016/0180338 A1 | 6/2016 | Androulaki et al. | |
| 2016/0203448 A1 | 7/2016 | Metnick et al. | |
| 2016/0203477 A1 | 7/2016 | Yang et al. | |
| 2016/0283941 A1 | 9/2016 | Andrade | |
| 2016/0284022 A1 | 9/2016 | Weigold et al. | |

FOREIGN PATENT DOCUMENTS

| | | | |
|---|---|---|---|
| WO | 2015144971 A1 | 10/2015 | |
| WO | 2015175854 A2 | 11/2015 | |
| WO | 2015183497 A1 | 12/2015 | |

OTHER PUBLICATIONS

David Yermack, "Is Bitcoin a Real Currency? An Economic Appraisal," National Bureau of Economic Research, NBER Working Paper No. 19747, Dec. 2013, 24 pages.

N. Frykholm et al., "Error-Tolerant Password Recovery," Proceedings of the 8th ACM Conference on Computer and Communications Security, Nov. 2001, pp. 1-9.

J. Camenisch et al., "An Efficient System for Non-Transferable Anonymous Credentials with Optional Anonymity Revocation," Advances in Cryptology—EUROCRYPT 2001, May 2001, 30 pages.

Coinbase, "Security for Your Peace of Mind," https://www.coinbase.com/security, 2016, 3 pages.

CEX.IO LTD, "Identity Verification Guide," https://support.cex.io/hc/en-us/articles/215744957-Identity-Verification-Guide, 2016, 11 pages.

Coinmama, "Welcome to CoinMama! The Easiest Way to Buy Bitcoin," https://www.coinmama.com/how-does-it-work, 2016, 2 pages.

Circle Internet Financial Limited, "About," https://www.circle.com/en/about, 2016, 2 pages.

* cited by examiner

SYSTEMS AND METHODS FOR SECURING CRYPTOCURRENCY PURCHASES

PRIORITY CLAIM

The present application claims priority to U.S. Provisional Patent Application Ser. No. 62/248,011, filed Oct. 29, 2015 and entitled "Systems and Methods for Securing Bitcoin Purchases," which is incorporated by reference herein in its entirety.

FIELD

The field relates generally to cryptocurrencies such as Bitcoin and Ethereum, and more particularly to techniques for purchasing or otherwise processing cryptocurrencies.

BACKGROUND

Conventional systems for purchasing cryptocurrencies can be problematic. For example, purchasing Bitcoin today can be an onerous process, in that many Bitcoin vendors do not permit purchase via credit card or debit card, and those that do typically require consumers to undergo elaborate authentication processes. This may include requiring a consumer to submit a video of himself or herself holding his or her passport. Additionally or alternatively, some vendors that permit use of credit or debit cards for Bitcoin purchases place unduly strict limits on the amounts of Bitcoin that can be purchased by a given consumer. Vendors need to exercise such caution because of the risk of consumer repudiation of Bitcoin transactions, which today produce no verifiable transaction chain through to delivery to the consumer. Such challenges have impeded the adoption of Bitcoin and other cryptocurrencies.

SUMMARY

Illustrative embodiments of the invention provide systems and methods for securing purchases of Bitcoin, Ethereum or other types of cryptocurrency via credit card, debit card or other purchasing mechanisms. These and other embodiments can advantageously facilitate more widespread usage of cryptocurrencies such as Bitcoin and Ethereum, as well as numerous other types of cryptocurrencies.

For example, some embodiments are configured to create, in the view of a bank or other financial institution, a binding between identity information of a user and a particular cryptocurrency address of that user, so as to ensure that the user cannot later fraudulently claim to have never received cryptocurrency purchases made from a cryptocurrency vendor on a credit card or debit card.

In one embodiment, an apparatus comprises a processing platform having at least one processing device. The processing platform implements a database configured to store bindings between user identity information and respective cryptocurrency addresses for users of an address-based cryptocurrency such as Bitcoin or Ethereum. The processing platform also implements an account-identity service system accessible to at least one cryptocurrency vendor. The account-identity service system is configured to utilize the stored bindings to respond to queries from the cryptocurrency vendor. A given one of the queries from the cryptocurrency vendor identifies a particular one of the users and a corresponding cryptocurrency address for which the particular user has requested to purchase an amount of the address-based cryptocurrency from the cryptocurrency vendor. The account-identity service system is configured to generate a response to the given query that indicates whether or not the particular user has its user identity information bound to the corresponding cryptocurrency address for the requested purchase in one of the stored bindings of the database.

The cryptocurrency addresses in some embodiments are derived at least in part from respective public keys of cryptocurrency key pairs of respective ones of the users, although other arrangements are possible.

The processing platform in a given embodiment may be associated with a financial institution. In such an embodiment, the particular user identified in the given query may be attempting to utilize a payment card issued by the financial institution to purchase the amount of the address-based cryptocurrency from the cryptocurrency vendor. The processing platform is illustratively configured to store information characterizing the cryptocurrency vendor queries processed by the account-identity service system. The stored information characterizing the processed queries and the stored bindings of the database collectively serve to ensure that one or more of the users that purchase amounts of the address-based cryptocurrency from the cryptocurrency vendor using payment cards issued by the financial institution cannot fraudulently repudiate those payment card purchases at a later date.

These and other illustrative embodiments of the invention include but are not limited to systems, methods, apparatus, processing devices, integrated circuits, and computer program products comprising processor-readable storage media having software program code embodied therein.

DETAILED DESCRIPTION

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements.

Figure 1:
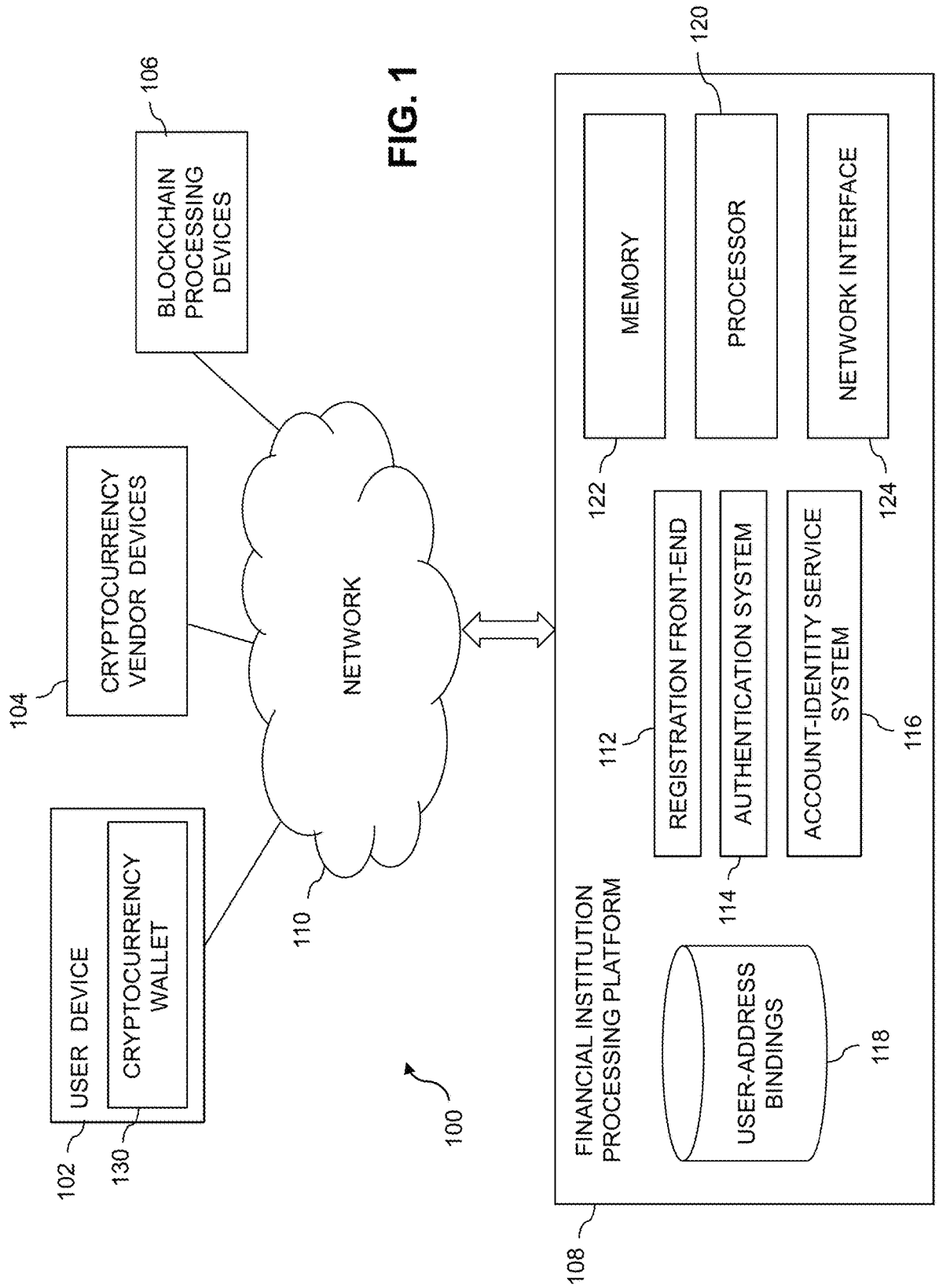
FIG. 1 is a block diagram of an information processing system comprising a processing platform configured with functionality for securing cryptocurrency purchases in an illustrative embodiment.

FIG. 1 shows an information processing system 100 in an illustrative embodiment. The information processing system comprises a user device 102, cryptocurrency vendor devices 104, blockchain processing devices 106, and a processing platform 108, all of which are coupled to a network 110.

The user device 102 comprises a laptop, tablet or desktop personal computer, a mobile telephone, or another type of computer or processing device associated with a given cryptocurrency user within the system 100. Although only a single user device 102 is shown in the figure, the system 100 is assumed to include multiple such devices each associated with a different cryptocurrency user.

The cryptocurrency vendor devices 104 comprise respective computers or other processing devices of one or more cryptocurrency vendors. A given such "cryptocurrency vendor" as the term is broadly used herein is intended to encompass any entity that offers an amount of cryptocurrency for sale to a cryptocurrency user.

The blockchain processing devices 106 comprise respective computers or other processing devices of one or more cryptocurrency "miners" or other blockchain processing entities. Such entities perform well-known processing operations in order to maintain a public ledger in the form of a blockchain characterizing transactions involving a particular cryptocurrency. A given blockchain processing entity may additionally be a cryptocurrency user and/or a cryptocurrency vendor.

The processing platform 108 in the present embodiment is assumed to be associated with a financial institution such as a bank or other issuer of credit cards, debit cards or other types of payment cards or more generally payment mechanisms. Examples of payment mechanisms other than payment cards that can be utilized in illustrative embodiments include checks or other similar financial instruments. More particularly, in the case of a check or other similar financial instrument, an image of the check or financial instrument could be used in combination with evidence of user identity. Illustrative embodiments of secure cryptocurrency purchase functionality disclosed herein are generally utilizable with any form of financial instrument for which there is a need to verify the identity of the user.

The processing platform 108 may be implemented within a physical facility of a given financial institution. Alternatively, the processing platform 108 may be maintained by another entity such as a cloud service provider. In such an arrangement, the financial institution may be a tenant of the cloud service provider. In other embodiments, the processing platform 108 need not be associated with any particular financial institution, but could instead be associated with another type of entity, such as a given business enterprise or other organization that provides secure cryptocurrency purchase functionality on behalf of multiple otherwise-unrelated financial institutions.

The network 110 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 108 in the present embodiment comprises a registration front-end 112, an authentication system 114, an account-identity service system 116, and a database 118 that stores bindings between user identity information and respective cryptocurrency addresses for users of an address-based cryptocurrency. Such bindings are also referred to herein as "user-address bindings." The term "binding" as used herein is intended to be broadly construed to encompass a wide variety of different techniques for establishing an association within a processing platform between user identity information and a cryptocurrency address of the corresponding user.

The processing platform 108 further comprises a processor 120, a memory 122 and a network interface 124.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 122 stores software program code for execution by the processor 120 in implementing portions of the functionality of the processing platform 108. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals. A wide variety of other types of computer program products comprising processor-readable storage media can be implemented in other embodiments.

In the FIG. 1 embodiment, at least portions of the registration front-end 112, authentication system 114 and account-identity service system 116 are implemented in the form of software that is stored by memory 122 and executed by processor 120.

The network interface 124 illustratively comprises one or more network interface cards, transceivers or other types of circuitry utilized to interface the processing platform 108 with the user device 102 and cryptocurrency vendor devices 104 over the network 110.

It is assumed for the present embodiment that the cryptocurrency utilized in the system 100 comprises an address-based cryptocurrency such as Bitcoin or Ethereum, although it is to be appreciated that a wide variety of other types of cryptocurrencies can be used in other embodiments. In addition, the cryptocurrency addresses in the present embodiment illustratively are derived at least in part from respective public keys of cryptocurrency key pairs of respective ones of the cryptocurrency users, where the cryptocurrency key pair of a given user is more particularly associated with a corresponding cryptocurrency account of that user, although again it is to be appreciated that other types of cryptocurrency addresses can be used. In the case of Bitcoin, the public addresses more particularly comprise hashes of respective public keys of cryptocurrency key pairs of respective ones of the cryptocurrency users.

Accordingly, terms such as "cryptocurrency" and "cryptocurrency address" as used herein are intended to be broadly construed. For example, cryptocurrencies are intended to encompass electronic currencies that involve certain types of cryptographic processing, including but not limited to address-based virtual currencies.

The registration front-end 112 is illustratively configured to support registration by the cryptocurrency users of their user identity information in association with respective cryptocurrency addresses of those users. The registration front-end 112 is also assumed to be configured to support registration by multiple cryptocurrency vendors as respective authorized cryptocurrency vendors able to submit queries to the account-identity service system 116. The registration front-end 112 illustratively comprises respective distinct sets of one or more web forms or other web pages accessible to the user device 102 and the cryptocurrency vendor devices 104 over the network 110. In other embodiments, different registration front-ends may be provided for the cryptocurrency users and the cryptocurrency vendors.

The authentication system 114 is configured to control access of the cryptocurrency users to cryptocurrency address registration functionality of the processing platform 108. It may additionally or alternatively be configured to control access of the cryptocurrency vendors to the account-identity service system 116. As in the case of the registration front-end 112, different authentication systems may be provided for the cryptocurrency users and the cryptocurrency vendors.

The account-identity service system 116 is assumed to be accessible to one or more authorized cryptocurrency vendors via the cryptocurrency vendor devices 104 and the network 110. The account-identity service system 116 is configured to utilize the stored user-address bindings of the database 118 to respond to queries received from the cryptocurrency vendors. In the present embodiment, a given one of the queries from a cryptocurrency vendor identifies a particular one of the users and a corresponding cryptocurrency address for which the particular user has requested to purchase an amount of the address-based cryptocurrency from the cryptocurrency vendor.

The account-identity service system 116 is further configured to generate a response to the given query that indicates whether or not the particular user has its user identity information bound to the corresponding cryptocurrency address for the requested purchase in one of the stored bindings of the database 118.

The account-identity service system 116 illustratively comprises one or more application programming interfaces (APIs) that permit authorized cryptocurrency vendors to submit queries of the type described above.

As indicated previously, it is assumed in the present embodiment that the processing platform 108 is implemented by or on behalf of, or is otherwise associated with, a financial institution. In such an arrangement, the particular user identified in the given query may be attempting to utilize a payment card issued by the financial institution to purchase the amount of the address-based cryptocurrency from the cryptocurrency vendor. The term "payment card" as used herein is intended to be broadly construed so as to encompass, for example, credit cards, debit cards or other types of card-based payment mechanisms that may be issued by a bank or other financial institution.

The processing platform 108 is illustratively configured to store information characterizing the cryptocurrency vendor queries processed by the account-identity service system 116. Such information may be stored in association with the corresponding user-address bindings in the database 118, or may be stored in a separate database or alternative storage device, or in another type of memory. The term "database" as used herein is intended to be broadly construed so as to encompass all such storage arrangements. The stored information characterizing the processed queries and the stored bindings of the database 118 collectively serve to ensure that the cryptocurrency users that purchase amounts of the address-based cryptocurrency from the cryptocurrency vendor using payment cards issued by the financial institution cannot fraudulently repudiate those payment card purchases at a later date.

In some embodiments, the processing platform 108 is configured to generate a given one of the stored bindings of the database 118 based at least in part on one or more digitally-signed secrets associated with a given one of the users. Such a secret may comprise, for example, private information that is incorporated into a ciphertext generated by the user device 102, or other types of information that is typically maintained in secrecy by the user. The one or more secrets are digitally signed using a secret key of a cryptocurrency key pair of the given user. As noted above, the cryptocurrency key pair of the given user is more particularly associated with a corresponding cryptocurrency account of that user. Other arrangements for proving user identity can be used in other embodiments.

As a more particular example, the processing platform 108 may be configured to generate a given one of the stored bindings based at least in part on a ciphertext received for a given one of the users, the ciphertext being digitally signed using a secret key of a cryptocurrency key pair of the given user.

The user device 102 in the FIG. 1 embodiment comprises a cryptocurrency wallet 130. The cryptocurrency wallet 130 in this embodiment is assumed to generate the ciphertext and the digital signature on the ciphertext, although other arrangements are possible.

The ciphertext illustratively comprises payment card information for a payment card issued to the given user by the financial institution, other private information of the given user, and user identity information for the given user. The payment card information, the other private information and the user identity information are encrypted under a public key of the financial institution to generate the ciphertext.

The processing platform 108 in this example is configured to verify correctness of the digital signature on the ciphertext relative to the public key of the cryptocurrency key pair of the given user, to decrypt the ciphertext using a secret key of the financial institution to obtain the payment card information, the other private information and the user identity information, to verify correctness of the information obtained from the decrypted ciphertext for the given user, to obtain the cryptocurrency address of the given user based at least in part on a public key of the cryptocurrency key pair of the given user, and to store a binding between the user identity information and the cryptocurrency address in the database 118.

In other embodiments, the processing platform 108 is configured to generate a given one of the stored bindings of the database 118 based at least in part on a public binding between an email address of a given one of the users and a cryptocurrency address of that user. For example, the processing platform 108 can be configured to generate the given stored binding based at least in part on a confirmation that the given user has registered with the processing platform 108 an email address that corresponds to the email address utilized in the public binding. Additionally or alternatively, the processing platform 108 can be configured to generate the given stored binding based at least in part on a confirmation that the given user has authenticated to the processing platform using a unique link sent by the processing platform to the email address utilized in the public binding.

It is to be appreciated that the particular arrangement of elements illustrated in the FIG. 1 embodiment is presented by way of example only. Other embodiments can use different arrangements of devices, processing platforms, networks and other elements to implement functionality for securing cryptocurrency purchases as disclosed herein.

Figure 2:
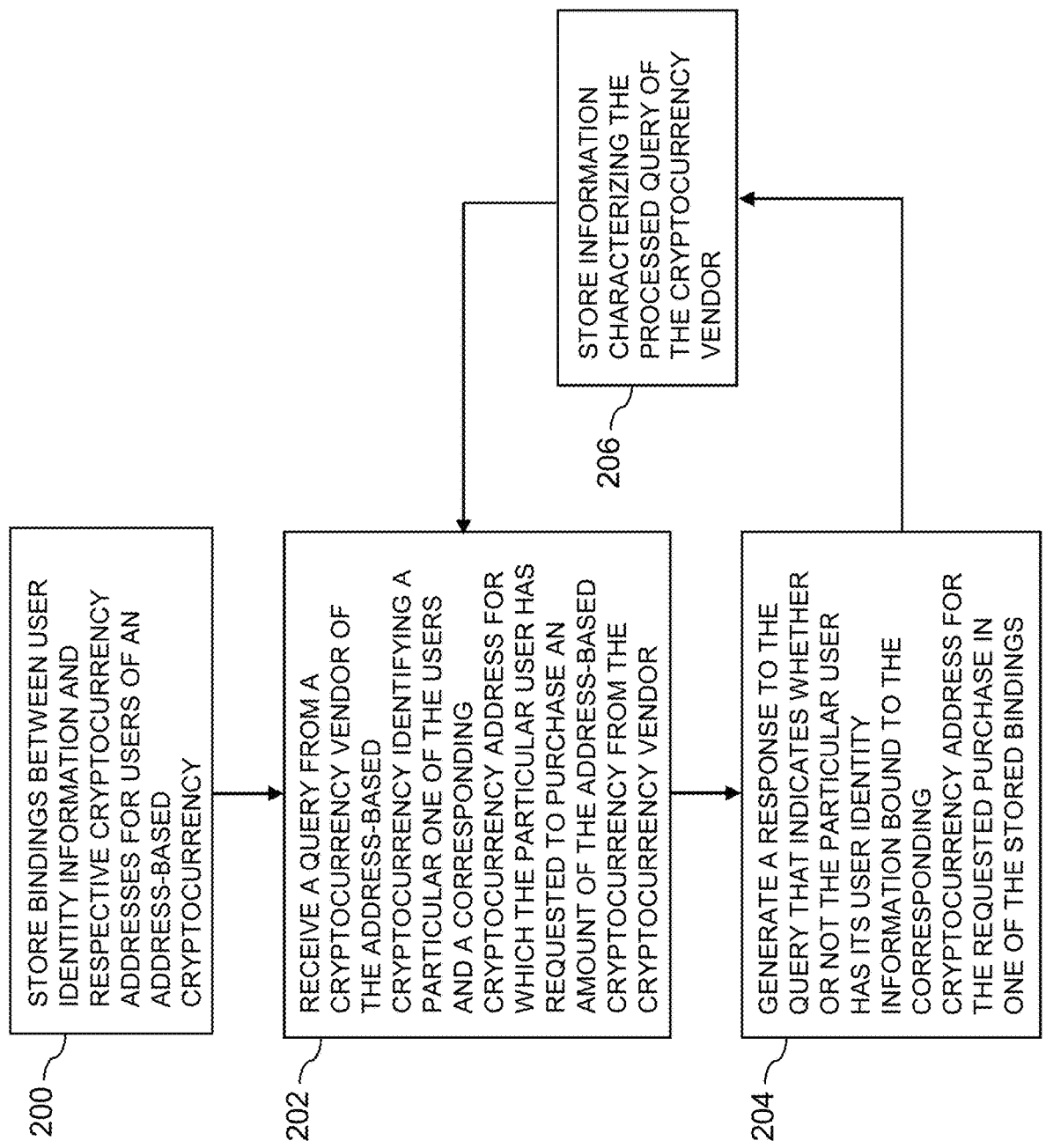
FIG. 2 is a flow diagram of an example process for securing cryptocurrency purchases utilizing the processing platform of the FIG. 1 embodiment.

Referring now to FIG. 2, a flow diagram of an example process for securing cryptocurrency purchases is shown. The process as illustrated includes steps 200 through 206, which are assumed to be performed by the processing platform 108 in the information processing system 100 of the FIG. 1 embodiment.

In step 200, bindings between user identity information and respective cryptocurrency addresses for users of an address-based cryptocurrency are stored. These user-address bindings are illustratively stored in the database 118 of the processing platform 108 utilizing information obtained from cryptocurrency users at least in part via the registration front-end 112 and the authentication system 114.

A given one of the stored bindings may be generated based at least in part on one or more digitally-signed secrets associated with a given one of the users, with the one or more secrets being digitally signed using a secret key of a cryptocurrency key pair of the given user. Such digitally-signed secrets are illustratively received in the registration front-end 112 of the processing platform 108 from cryptocurrency wallet 130 of user device 102 over network 110, but can additionally or alternatively be received from another system entity, such as one of the cryptocurrency vendor devices 104.

Numerous other arrangements for generating stored bindings are possible. For example, in other embodiments, a given one of the stored bindings may be generated based at least in part on a public binding between an email address of a given one of the users and a cryptocurrency address of that user.

In step 202, a query is received from a cryptocurrency vendor of the address-based cryptocurrency. The query is illustratively received over the network 110 from one of the cryptocurrency vendor devices 104 associated with the cryptocurrency vendor. The query identifies a particular one of the users and a corresponding cryptocurrency address for which the particular user has requested to purchase an amount of the address-based cryptocurrency from the cryptocurrency vendor.

In step 204, a response to the query is generated. The response is illustratively generated by the account-identity service system 116 of the processing platform 108 based at least in part on the current state of the stored user-address bindings in database 118. The response indicates whether or not the particular user identified in the query has its user identity information bound to the corresponding cryptocurrency address for the requested purchase in one of the stored bindings of the database 118. The response is illustratively provided back to the device of the cryptocurrency vendor over the network 110 via the network interface 124 of the processing platform 108. The cryptocurrency vendor utilizes the response to determine whether or not to allow the particular user to proceed with the requested purchase. For example, if the response indicates that there is an appropriate stored user-address binding in the database 118 for the particular user, the cryptocurrency vendor will allow the requested purchase to proceed, and otherwise will deny the requested purchase.

In step 206, information characterizing the processed query of the cryptocurrency vendor is stored by the processing platform 108. Such information illustratively identifies the particular user and his or her cryptocurrency account, the cryptocurrency vendor that generated the query, and the credit card, debit card or other payment card or purchasing mechanism proposed for use in the purchase, as well as information that was provided in the response generated by the account-identity service system 116.

The process then returns to step 202 to process additional queries from one or more cryptocurrency vendors relating to other requested purchases of amounts of the cryptocurrency by cryptocurrency users.

Although not illustrated in the figure, the process will generally include additional iterations of step 200 that are performed as needed in order to store additional bindings between user identity information and respective cryptocurrency addresses in the database 118. For example, such additional bindings may be stored as new cryptocurrency users register with the processing platform 108 or as new cryptocurrency accounts are created by new or existing cryptocurrency users.

The stored information characterizing cryptocurrency vendor queries processed by the account-identity service system 116 and the stored bindings of the database 118 collectively serve to ensure that the cryptocurrency users that purchase amounts of the address-based cryptocurrency from the cryptocurrency vendors using payment cards issued by the financial institution associated with the processing platform 108 cannot fraudulently repudiate those payment card purchases at a later date.

It should be noted that the particular process steps illustrated in FIG. 2 are presented by way of illustrative example only, and should not be construed as limiting in any way. Other embodiments can utilize additional or alternative steps in providing functionality for securing cryptocurrency purchases. For example, certain process steps illustrated as being performed serially in the figure can in other embodiments be performed at least in parallel with one another. Also, multiple instances of the process can be performed simultaneously for different sets of cryptocurrency user or vendors.

The illustrative embodiments of FIGS. 1 and 2 advantageously permit a cryptocurrency user to bind his or her identity in a private and authenticable manner to a cryptocurrency account by creating in the view of a bank or other financial institution a binding between user identity information and a particular cryptocurrency address of that user. For example, as transfers between accounts for cryptocurrencies such as Bitcoin and Ethereum are visible in the blockchain, the illustrative embodiments can produce an end-to-end transaction record that may be used by an issuer of a credit card, debit card or other payment card to confirm that a sale of cryptocurrency has taken place. These embodiments can render sales of Bitcoin, Ethereum or other cryptocurrencies safer for vendors and purchasers alike, addressing a critical barrier to cryptocurrency adoption. In addition, these techniques can facilitate "Know Your Customer" financial regulations in the United States and elsewhere aimed at stemming criminal financial transactions.

Additional illustrative embodiments providing similar advantages will now be described in further detail. It is assumed for these embodiments that the cryptocurrency is Bitcoin and the purchase is being made with a credit card, although it will be apparent that these and other embodiments disclosed herein can be extended in a straightforward manner to other cryptocurrencies and other payment mechanisms.

In each of the additional illustrative embodiments to be described, a user U is attempting to use a credit card issued by a bank B to buy an amount of Bitcoin from a vendor V for delivery to a public address A. The public address A is illustratively a public key of a key pair of a Bitcoin account of the user U, and is also referred to as Bitcoin address A of the user U, although other types of public addresses can be used in other embodiments.

Under conventional practice, there is no convenient system for Bitcoin purchase via credit card chiefly due to security issues underlying the purchase of what is essentially cash. For example, if user U buys Bitcoin from vendor V for delivery to public Bitcoin address A, the user can easily later claim to his or her credit card issuer that he or she never received any Bitcoin. The credit card issuer has no way of confirming or refuting such a claim, as conventional practice provides no trustworthy publicly available binding between A and U. Instead, conventional approaches to this problem of Bitcoin purchasing involve a series of convoluted identity verification procedures including but not limited to:

1. Recording a video that shows your face, a government ID, and both sides of the credit card you are using to purchase;
2. Buying Second Life Lindens via credit card and then exchanging them for Bitcoin; and
3. Buying a real life product (e.g., shoes) for someone via credit card and then having him/her pay you in Bitcoin.

These conventional approaches generally attempt to work around the problem by offloading liability to a third party (i.e., not the user or the bank) should fraud occur. They are cumbersome, and their speed and security depend fundamentally on the thoroughness of the security processes implemented by individual vendors.

The additional illustrative embodiments to be described below ease the burden on a user seeking to purchase Bitcoin via credit card. Details provided below for each of these embodiments include a description of how it works, a list of potential security challenges, and an analysis of the burden on three exemplary participating parties, namely, user U, bank B and vendor V. For clarity and simplicity of description in these embodiments, participating financial institutions are treated monolithically under the aegis of B. However, it is to be appreciated that B may encompass not only an issuing bank, but additionally or alternatively a merchant bank, transaction settlement infrastructure, or other type of financial institution or associated entity. User U's private key and the corresponding public key are denoted respectively by SK and PK. The private key PK in some embodiments comprises U's Bitcoin address A.

User U is assumed to be associated with a user device such as user device 102 of FIG. 1. Similarly, vendor V is assumed to be associated with a cryptocurrency vendor device such as one of the cryptocurrency vendor devices 104 of FIG. 1. Finally, bank B is assumed to be associated with a processing platform such as processing platform 108 that implements account-identity service system 116 and other related components. The devices of respective user U and vendor V communicate with the processing platform of bank B over one or more networks such as the network 110 in FIG. 1.

The illustrative embodiments to be described below are configured to create in the view of B a binding between U and PK, and may be viewed as examples of what are also referred to herein as Unique-Public-Key (UPK) solutions. It is again noted that although these particular embodiments are described in relation to Bitcoin, this is by way of example only, and other illustrative embodiments can utilize other types of cryptocurrencies, including any address-based virtual currency system (e.g., Ethereum, Litecoin, etc.). A wide variety of alternative UPK solutions can be implemented in other embodiments.

In a first one of the additional illustrative embodiments to be described, user U directly registers Bitcoin address A with bank B. More particularly, in this embodiment, U authenticates to and directly registers A with B. Bitcoin vendors may then safely sell via credit card to users with public keys registered with B, as B is able to determine via inspection of the blockchain that a Bitcoin transfer has been made to U. This embodiment includes the following example operations:

1. Registration: U, a customer of B for which B has issued a credit card, logs into his or her account on B's website. U authenticates, for example, with a password or using second-factor authentication. U registers A as a Bitcoin address in his or her possession. B records a binding between U and A.

2. Purchase Mechanics: When U purchases Bitcoin via credit card from Bitcoin vendor V and requests that the purchased Bitcoin be sent to address A, V does the following:
   a) Determines the identity of B, the bank that issued the credit card.
   b) Sends a query (U, A) to an account-identity service (AIS) maintained by B in order to confirm that U has registered the address A with B:
      i) If so, V allows the purchase;
      ii) If not, V may require further identity verification or simply deny the purchase.
   It is noted that the AIS should only be made accessible by B to trustworthy vendors, as general-purpose access could be used to deanonymize Bitcoin users. For example, it is possible for an authorized vendor V to send a specious query (U, A) to B in an attempt to deanonymize U in the Bitcoin network. B may thus choose to revoke service rights from a vendor that makes a disproportionate number of incorrect queries.
   As an alternative, simpler option, V may simply submit a charge against U's credit card, providing an indication that the charge is made for Bitcoin purchases against address A. (e.g., A could be encoded in the merchant name.)

3. Fraud Claim Investigation: U might dispute a charge V made at time T for the purchase of a logged quantity of Bitcoin. B can verify the transfer of the logged quantity of Bitcoin from an account specified by V to the account identified by the Bitcoin address A at the claimed transaction time.

The implementation overhead for this embodiment illustratively includes the following:

For the user: For every Bitcoin account for which U wishes to purchase Bitcoin via credit card, U logs in to his or her account with B, and furnishes his or her Bitcoin account address. Such functionality may be implemented at least in part using a Bitcoin wallet of user U. The Bitcoin wallet may be viewed as an example of the cryptocurrency wallet 130 of user device 102 in the FIG. 1 embodiment.

For the bank: The bank implements the following four components: (1) a front-end that enables a user to register a Bitcoin address (e.g., a web form); (2) a database or database-extension that stores (U, A) bindings; (3) the AIS; and (4) an authorization system for vendor access to the AIS. These components in context of the FIG. 1 embodiment are illustratively provided by registration front-end 112, user-address bindings database 118, account-identity service system 116 and authentication system 114, respectively.

For the vendor: The vendor V deploys a system capable of querying B's APIs for information relating to users' Bitcoin account registrations. Such a system is illustratively deployed as a component of a vendor device of vendor V. The resulting vendor device may be viewed as an example of one of the cryptocurrency vendor devices 104 of FIG. 1.

Additional or alternative components can be deployed by one or more of the user, bank and vendor in other embodiments.

Potential security issues in this embodiment include the following:

In the user-bank layer: An unknowledgeable user may accidentally provide his or her Bitcoin private key instead of his or her Bitcoin address to the bank, rendering the Bitcoin private key vulnerable in the bank's systems. This problem is easily avoidable via imposing length restrictions on an appropriate input field of a registration web form, as Bitcoin private keys are longer than public addresses.

In a user-bank session: malware, cross-site request forgery (XSRF) and related attacks could allow attackers to inject data into a user's session with B, register a false Bitcoin account, and purchase Bitcoin with the user's credit card.

In a second one of the additional illustrative embodiments, the user registers a Bitcoin address A with B by digitally signing using SK (and encrypting) data proving his or her real-world identity. More particularly, a message digitally signed using SK may be verified under PK to originate with the owner of the account corresponding to address A. Thus, by digitally signing an (encrypted) set of secrets proving his or her real-world identity, user U may prove to B a binding between U and A.

Such a digital signature may be produced by an extension to an otherwise conventional Bitcoin wallet. An advantage to producing a signature in a wallet is that it obviates the need for exporting SK, which can endanger a user.

This embodiment includes the following example operations:

1. Registration:
   a) U opens his or her Bitcoin wallet and activates credit card registration functionality (e.g., presses a "Register Credit Card" button).
   b) The wallet retrieves from storage or prompts the user to input private information, which may include:
      i) Credit card information (CCI): E.g., credit card number, expiration date, and card verification value or CVV; and
      ii) Other private information (PI): Information whose knowledge authenticates U, e.g., U's Social Security number, billing address, mother's maiden name, password associated with bank B, passport image, etc.
   c) The wallet identifies bank B based on the credit card number, and encrypts all or a subset of CCI, PI, and U under a public key for B (e.g., that in B's HTTPS certificate). The resulting ciphertext is denoted by C. The ciphertext C therefore need not include all of CCI, PI, and U encrypted under the public key for B. Accordingly, some implementations are configured to allow a portion of such data (e.g., the credit card number) to be accessible to the vendor V.
   d) The wallet may optionally place a subset of (CCI, PI, and U) or other, supplementary data, in a plaintext field D.
   e) The wallet digitally signs a portion or all of (C, D) using SK (under, e.g., ECDSA in Bitcoin), yielding digital signature S. The wallet sends the tuple (C, D, S, PK) to B.
   f) Upon receiving the tuple (C, D, S, PK), B can determine and verify the binding (U, A) as follows:
      i) B verifies the correctness of the signature S on (C, D) relative to PK; and
      ii) B decrypts C and verifies the correctness of CCI, PI, and any other data in (C, D) for U.
      If everything verifies correctly, B computes A from PK and records the binding (U, A). This binding may be used to authorize a single transaction or may be used additionally for future transactions. As mentioned previously, the private key PK in some embodiments is the same as the Bitcoin address A.

The remaining operations in this second additional embodiment, including 2. Purchase Mechanics and 3. Fraud Claim Investigation, are similar to the corresponding operations in the first additional embodiment previously described.

It is noted that the tuple (C, D, S, PK) in this second additional embodiment can be safely transmitted to B via V upon purchase of Bitcoin.

Potential security issues in this embodiment include the following:

Malicious wallet: Malicious developers could offer wallets that commit identity theft. For example, a wallet might faithfully execute the above protocol, but relay CCI and PI to the developer. Of course, a similar risk already exists today, in that a malicious wallet could leak SK and permit theft of Bitcoin.

Figure 3:
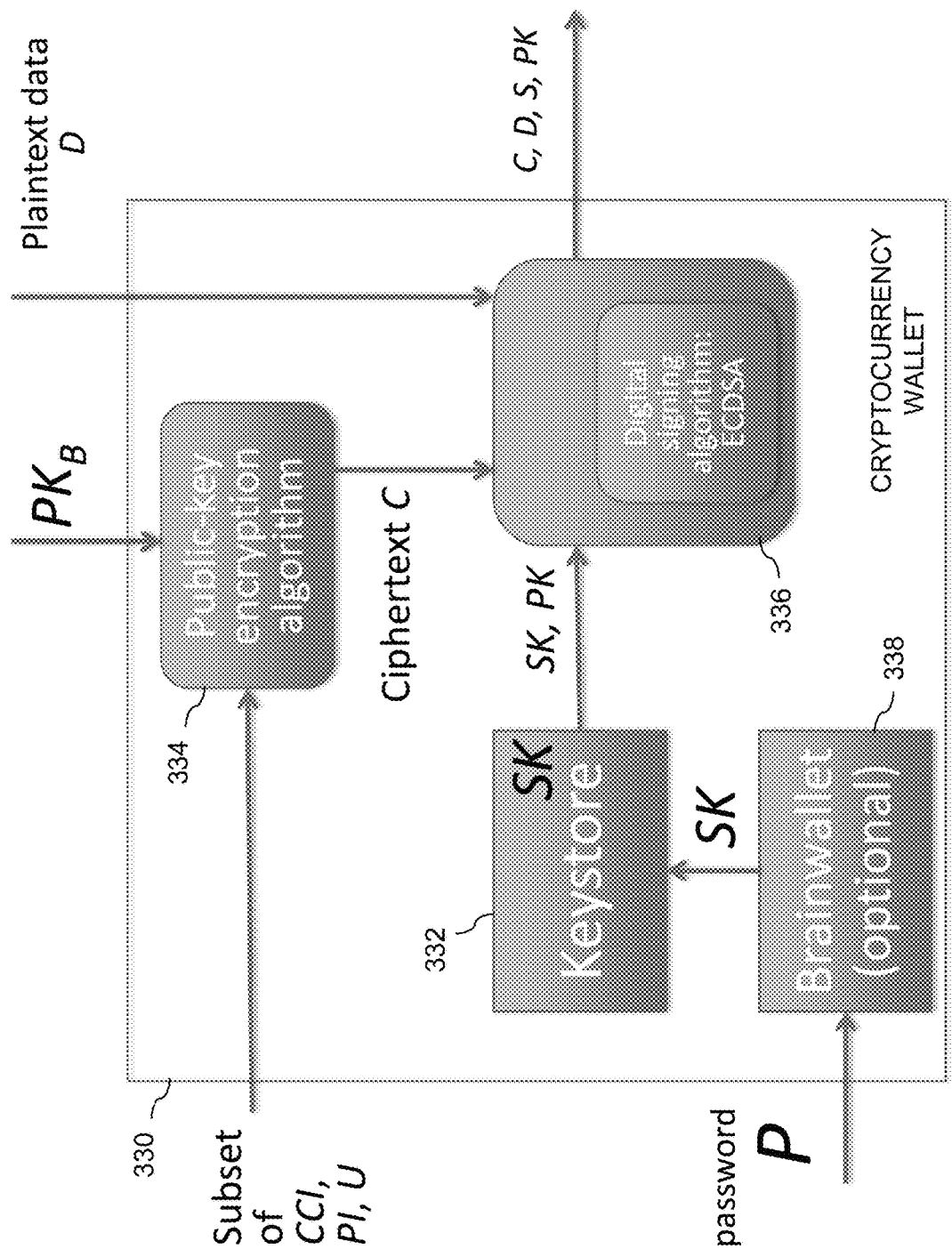
FIG. 3 shows an example of one possible cryptocurrency wallet configuration on a user device in another illustrative embodiment.

FIG. 3 shows an example of a cryptocurrency wallet 330 configured to implement the wallet-related operations of the protocol described above. It is assumed that the cryptocurrency wallet 330 in this embodiment more particularly comprises a Bitcoin wallet implemented on a user device of the user U. Accordingly, the cryptocurrency wallet 330 is implemented at least in part utilizing at least one processing device comprising a processor coupled to a memory. The cryptocurrency wallet 330 in this embodiment includes a keystore 332 for storing the secret key SK, a first cryptographic processing module 334 implementing a public-key encryption algorithm to generate the ciphertext C, and a second cryptographic processing module 336 implementing a digital signing algorithm such as ECDSA, where ECDSA denotes "Elliptic Curve Digital Signature Algorithm." The cryptocurrency wallet 330 is also illustratively shown as comprising an optional "brainwallet" element 338 that allows the secret key SK to be generated from a password P of the user U.

The designation of the brainwallet 338 as optional in the FIG. 3 embodiment should not be construed as an indication that other elements are required. Accordingly, other cryptocurrency wallets implemented in accordance with the above-described embodiment or other embodiments herein can have different arrangements of modules or other components and can implement different types of cryptographic algorithms. For example, a wide variety of different digital signing algorithms other than ECDSA can be used.

As one possible variant of the second additional embodiment, the plaintext data D can be eliminated, and a triple (C, S, PK) utilized in place of the tuple (C, D, S, PK). The triple (C, S, PK) can similarly be safely transmitted to B via V upon purchase of Bitcoin.

The keystore 332, cryptographic processing modules 334 and 336 and brainwallet 338 of the cryptocurrency wallet 330 of FIG. 3 can be implemented utilizing processor and memory elements and associated software components of the corresponding user device. As mentioned previously, such a user device is considered an example of a "processing device" as that term is broadly utilized herein.

In a third one of the additional embodiments, the user leverages a published email-to-Bitcoin-address binding to establish a binding (U, A). The IETF internet-draft "Using DANE to associate payment information with email addresses" (draft-wiley-paymentassoc-00) proposes mechanisms for creating a public binding between payment information, a Bitcoin address, for instance, and an email address. Should it be adopted, this standard or another mechanism like it could also be used to facilitate credit card purchases of Bitcoin.

For example, in this third additional embodiment, given a binding (E, A) between an email address and a Bitcoin account having address A, the bank B can leverage the binding to establish a binding of the form (U, A). This can be accomplished, by way of example, using at least one of the following two distinct methods:

1. B can simply confirm that the user U has registered with it (and confirmed possession of) an email address identical with E, or request that the user perform such registration.

2. B can send email to E containing a unique link (e.g., one bearing a nonce) that directs U to authenticate to B by, for example, logging into his or her online account with B. Such email can be used to register the binding (U, A) prior to or during a Bitcoin purchase transaction.

The embodiments described above are considered illustrative only, and should not be viewed as limited to any particular arrangement of features. Numerous alternative embodiments are possible. For example, those skilled in the art will recognize that alternative processing operations and associated system entity configurations can be used in other embodiments. It is therefore possible that other embodiments may include additional or alternative entities, relative to the user, bank and vendor entities of the illustrative embodiments. For example, although some embodiments refer to a single cryptocurrency vendor accessing an account-identity service provided by or on behalf of a financial institution, such a service in other embodiments is advantageously made accessible to multiple otherwise-unrelated cryptocurrency vendors. In addition, although some embodiments are described in detail with reference to purchase of Bitcoin using a credit card, these and other embodiments can be adapted for use with numerous other cryptocurrencies and payment mechanisms. Alternative payment mechanisms include, for example, debit cards or other types of payment cards, as well as other types of financial instruments such as checks.

Accordingly, the disclosed techniques can be implemented with cryptocurrencies other than Bitcoin as well as numerous alternative user, bank and vendor configurations, payment mechanisms, as well as other features.

It should also be noted that the above-described information processing system arrangements are exemplary only, and alternative system arrangements can be used in other embodiments.

For example, one or more of the illustrative embodiments disclosed herein can be implemented in conjunction with known cryptocurrency purchasing systems, such as, for example, Coinbase, CoinMama, Cex.io, Coin.mx, Circle and many others. Thus, a given information processing system configured to include functionality for securing cryptocurrency purchases as disclosed herein can additionally incorporate one or more aspects of a known cryptocurrency purchasing system.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, or other similar processing device component, as well as other types and arrangements of processing circuitry, in any combination. A given cryptographic processing module or other component of the cryptocurrency wallet of FIG. 3 can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with cryptocurrency processing as well as other related functionality.

Processing devices in a given embodiment can include, for example, laptop, tablet or desktop personal computers, mobile telephones, or other types of computers or communication devices, in any combination. For example, a computer or mobile telephone can be utilized by a user to access processing platforms associated with respective bank and vendor entities over a network.

These and other communications between the various elements of an information processing system comprising processing devices associated with respective user, bank and vendor entities may take place over one or more networks. Such networks can illustratively include, for example, a global computer network such as the Internet, a WAN, a LAN, a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks. The processing platform 108 in the FIG. 1 embodiment can be implemented at least in part using such cloud infrastructure.

The cloud infrastructure may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system. By way of example, components such as the registration front-end 112, authentication system 114 and account-identity service system 116 can be implemented using virtual machines controlled by a hypervisor.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA or other type of processing circuitry, as well as portions or combinations of such circuitry elements. The memory may comprise RAM, ROM or other types of memory, in any combination. Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, various user interfaces and other components of user, bank and vendor entities of a system can be implemented at least in part in the form of software.

Accordingly, a given component of an information processing system implementing cryptocurrency processing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. Thus, techniques illustrated in some embodiments herein in the context of securing Bitcoin purchases made via credit card or debit card can be adapted in a straightforward manner for use in other contexts involving different types of cryptocurrencies obtained through other purchasing mechanisms. The disclosed techniques can be similarly adapted for use in a wide variety of other types of information processing systems. Accordingly, embodiments of the invention should not be viewed as limited to any particular type of electronic currency, virtual currency or other type of cryptocurrency, or its associated processing contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks, and devices than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:
1. An apparatus comprising:
a processing platform comprising:
a database configured to store bindings between user identity information and respective cryptocurrency addresses for users of an address-based cryptocurrency; and an account-identity service system accessible over a network to at least one cryptocurrency vendor associated with a vendor device;

wherein the account-identity service system is configured to utilize the stored bindings of the database to respond to queries received from the vendor device of the cryptocurrency vendor over the network;

wherein the stored bindings are cryptographically established based at least in part on information digitally signed by respective ones of the users utilizing secret keys of respective cryptocurrency key pairs of those users;

a given one of the queries from the vendor device of the cryptocurrency vendor identifying a particular one of the users and a corresponding cryptocurrency address for which the particular user has requested to purchase an amount of the address-based cryptocurrency from the cryptocurrency vendor;

the account-identity service system being configured to generate a response to the given query that indicates whether or not the particular user has its user identity information bound to the corresponding cryptocurrency address for the requested purchase in one of the stored bindings of the database;

wherein generating the response to the given query comprises configuring the response to include information sufficient to allow the vendor device to determine therefrom whether to accept or reject the request of the particular user to purchase the amount of the address-based cryptocurrency from the cryptocurrency vendor without requiring further interaction between the vendor device and the processing platform;

wherein the processing platform utilizes information from a payment card issued by a financial institution to the particular user identified in the given query;

wherein the processing platform is configured to store information characterizing the cryptocurrency vendor queries processed by the account-identity service system, the stored information characterizing the processed queries and the stored bindings of the database collectively providing non-repudiation of associated cryptocurrency purchases; and wherein the processing platform is implemented by at least one processing device comprising a processor coupled to a memory.

2. The apparatus of claim 1 wherein the address-based cryptocurrency comprises one of Bitcoin and Ethereum.

3. The apparatus of claim 1 wherein at least a subset of the cryptocurrency addresses are derived at least in part from respective public keys of cryptocurrency key pairs of respective ones of the users.

4. The apparatus of claim 1 wherein the processing platform is associated with the financial institution and the particular user identified in the given query is attempting to utilize the payment card issued by the financial institution to purchase the amount of the address-based cryptocurrency from the cryptocurrency vendor.

5. The apparatus of claim 4 wherein the non-repudiation ensures that one or more of the users that purchase amounts of the address-based cryptocurrency from the cryptocurrency vendor using payment cards issued by the financial institution cannot fraudulently repudiate those payment card purchases at a later date.

6. The apparatus of claim 1 wherein the processing platform further comprises a registration front-end configured to support at least one of:

registration by the users of their user identity information in association with respective cryptocurrency addresses of those users; and registration by the cryptocurrency vendor as an authorized cryptocurrency vendor able to submit queries to the account-identity service system;

the registration front-end comprising at least one web page accessible to at least one of a user device and the vendor device over the network.

7. The apparatus of claim 1 wherein the processing platform further comprises an authentication system configured to control at least one of:

access of the users to cryptocurrency address registration functionality of the processing platform; and access of the cryptocurrency vendor to the account-identity service system.

8. The apparatus of claim 1 wherein the processing platform is configured to generate a given one of the stored bindings based at least in part on one or more digitally-signed secrets associated with a given one of the users, the one or more secrets being digitally signed using a secret key of a cryptocurrency key pair of the given user.

9. The apparatus of claim 1 wherein the processing platform is configured to generate a given one of the stored bindings based at least in part on a ciphertext received for a given one of the users, the ciphertext being digitally signed using a secret key of a cryptocurrency key pair of the given user.

10. The apparatus of claim 9 wherein the ciphertext and the digital signature on the ciphertext are generated by a cryptocurrency wallet implemented on a user device of the given user.

11. The apparatus of claim 9 wherein the ciphertext comprises:

payment card information for a payment card issued to the given user by the financial institution;

other private information of the given user; and user identity information for the given user;

wherein the payment card information, the other private information and the user identity information are encrypted under a public key of the financial institution to generate the ciphertext.

12. The apparatus of claim 11 wherein the processing platform is configured:

to verify correctness of the digital signature on the ciphertext relative to the public key of the cryptocurrency key pair of the given user;

to decrypt the ciphertext using a secret key of the financial institution to obtain the payment card information, the other private information and the user identity information;

to verify correctness of the information obtained from the decrypted ciphertext for the given user;

to obtain the cryptocurrency address of the given user based at least in part on a public key of the cryptocurrency key pair of the given user; and to store a binding between the user identity information and the cryptocurrency address in the database.

13. The apparatus of claim 1 wherein the processing platform is configured to generate a given one of the stored bindings based at least in part on a public binding between an email address of a given one of the users and a cryptocurrency address of that user.

14. The apparatus of claim 13 wherein the processing platform is configured to generate the given stored binding based at least in part on one or more of:

a confirmation that the given user has registered with the processing platform an email address that corresponds to the email address utilized in the public binding; and a confirmation that the given user has authenticated to the processing platform using a unique link sent by the processing platform to the email address utilized in the public binding.

15. A method comprising:

storing in a database bindings between user identity information and respective cryptocurrency addresses for users of an address-based cryptocurrency;

receiving over a network a query from a vendor device of a cryptocurrency vendor of the address-based cryptocurrency identifying a particular one of the users and a corresponding cryptocurrency address for which the particular user has requested to purchase an amount of the address-based cryptocurrency from the cryptocurrency vendor; and generating a response to the query that indicates whether or not the particular user has its user identity information bound to the corresponding cryptocurrency address for the requested purchase in one of the stored bindings;

wherein the stored bindings are cryptographically established based at least in part on information digitally signed by respective ones of the users utilizing secret keys of respective cryptocurrency key pairs of those users;

wherein generating the response to the given query comprises configuring the response to include information sufficient to allow the vendor device to determine therefrom whether to accept or reject the request of the particular user to purchase the amount of the address-based cryptocurrency from the cryptocurrency vendor without requiring further interaction between the vendor device and the processing platform;

wherein the method is performed by a processing platform, said processing platform comprising at least one processing device comprising a processor coupled to a memory;

wherein the processing platform utilizes information from a payment card issued by a financial institution to the particular user identified in the given query; and wherein the processing platform is configured to store information characterizing the cryptocurrency vendor queries processed by the account-identity service system, the stored information characterizing the processed queries and the stored bindings of the database collectively providing non-repudiation of associated cryptocurrency purchases.

16. The method of claim 15 wherein a given one of the stored bindings is generated based at least in part on one or more digitally-signed secrets associated with a given one of the users, the one or more secrets being digitally signed using a secret key of a cryptocurrency key pair of the given user.

17. The method of claim 15 wherein a given one of the stored bindings is generated based at least in part on a public binding between an email address of a given one of the users and a cryptocurrency address of that user.

18. A computer program product comprising a non-transitory processor-readable storage medium having stored therein program code of one or more software programs, wherein the program code when executed by a processing platform comprising at least one processing device causes said processing platform:

to store in a database bindings between user identity information and respective cryptocurrency addresses for users of an address-based cryptocurrency;

to receive over a network a query from a vendor device of a cryptocurrency vendor of the address-based cryptocurrency identifying a particular one of the users and a corresponding cryptocurrency address for which the particular user has requested to purchase an amount of the address-based cryptocurrency from the cryptocurrency vendor; and to generate a response to the query that indicates whether or not the particular user has its user identity information bound to the corresponding cryptocurrency address for the requested purchase in one of the stored bindings;

wherein the stored bindings are cryptographically established based at least in part on information digitally signed by respective ones of the users utilizing secret keys of respective cryptocurrency key pairs of those users;

wherein generating the response to the given query comprises configuring the response to include information sufficient to allow the vendor device to determine therefrom whether to accept or reject the request of the particular user to purchase the amount of the address-based cryptocurrency from the cryptocurrency vendor without requiring further interaction between the vendor device and the processing platform;

wherein the processing platform utilizes information from a payment card issued by a financial institution to the particular user identified in the given query; and wherein the processing platform is configured to store information characterizing the cryptocurrency vendor queries processed by the account-identity service system, the stored information characterizing the processed queries and the stored bindings of the database collectively providing non-repudiation of associated cryptocurrency purchases.

19. The computer program product of claim 18 wherein a given one of the stored bindings is generated based at least in part on one or more digitally-signed secrets associated with a given one of the users, the one or more secrets being digitally signed using a secret key of a cryptocurrency key pair of the given user.

20. The computer program product of claim 18 wherein a given one of the stored bindings is generated based at least in part on a public binding between an email address of a given one of the users and a cryptocurrency address of that user.

* * * * *